(12) United States Patent
Yoakim et al.

(10) Patent No.: US 9,162,815 B2
(45) Date of Patent: Oct. 20, 2015

(54) CAPSULE FOR THE PREPARATION OF A COFFEE EXTRACT HAVING A STRUCTURE FACILITATING PERFORATION FOR INJECTION OF WATER

(75) Inventors: Alfred Yoakim, St. Legier-la Chiesaz (CH); Patrice Borne, Publier (FR); Alexandre Kollep, Lutry (CH)

(73) Assignee: Nestec S.A., Vevey (CH)

( * ) Notice: Subject to any disclaimer, the term of this patent is extended or adjusted under 35 U.S.C. 154(b) by 701 days.

(21) Appl. No.: 12/856,369

(22) Filed: Aug. 13, 2010

(65) Prior Publication Data

US 2011/0041702 A1 Feb. 24, 2011

(30) Foreign Application Priority Data

Aug. 19, 2009 (EP) .................................... 09168130
Oct. 30, 2009 (EP) .................................... 09174573
Jan. 27, 2010 (EP) .................................... 10151781

(51) Int. Cl.
*B65B 29/02* (2006.01)
*A47J 31/44* (2006.01)
(Continued)

(52) U.S. Cl.
CPC ........... *B65D 85/8043* (2013.01); *A47J 31/005* (2013.01); *A47J 31/0663* (2013.01)

(58) Field of Classification Search
CPC ........... B65D 85/8043; B65D 85/8046; B65D 85/812; B65D 85/808; B65D 81/32; B65B 29/02; A47J 31/005; A47J 31/56; A47J 31/20; A47J 31/3614; A47J 31/007; A47J 31/057; A47J 31/0663; A47J 31/22; A47J 31/24; A47J 31/401; A47G 19/16

USPC ....... 99/279, 283, 287, 289 R, 291, 295, 300, 99/302 R, 302 C, 302 FB, 323, 323.3; 206/0.5; 426/77, 80, 81, 115, 394
See application file for complete search history.

(56) References Cited

U.S. PATENT DOCUMENTS

| 239,659 A | 4/1881 | Houston |
| 1,963,426 A | 6/1934 | Taylor .............................. 97/233 |

(Continued)

FOREIGN PATENT DOCUMENTS

| AT | 197553 B | 5/1958 |
| BE | 894 031 | 2/1983 |

(Continued)

OTHER PUBLICATIONS

International Search Report mailed Feb. 9, 2010 for Application No. PCT/EP2009/060697 filed Aug. 19, 2009.

(Continued)

*Primary Examiner* — Dana Ross
*Assistant Examiner* — Hemant Mathew
(74) *Attorney, Agent, or Firm* — K&L Gates LLP

(57) ABSTRACT

A capsule for the preparation of a coffee extract from coffee contained therein and hot water injected under pressure in the capsule by a water injection device. The capsule has a frusto-conical body with a rim, sidewall, and an inlet wall and a lower delivery wall sealed to the rim and contains a predosed amount of coffee. The inlet wall may have a flat or convex portion and a structure in relief or in recess arranged for facilitating penetration of blades belonging to the injection device and extending on a substantially circular path of predetermined radius R1 equal to the radius R2 of the circular path along which the blades of the injection device extend.

20 Claims, 10 Drawing Sheets

(51) Int. Cl.
*A47J 31/06* (2006.01)
*B65D 85/804* (2006.01)
*A47J 31/00* (2006.01)

(56) References Cited

U.S. PATENT DOCUMENTS

| | | | | |
|---|---|---|---|---|
| 1,963,476 | A | 6/1934 | Smith | 210/67 |
| 2,778,739 | A | 1/1957 | Rodth | 99/171 |
| 2,899,886 | A * | 8/1959 | Rodth | 99/295 |
| 2,952,202 | A | 9/1960 | Renner et al. | |
| 3,025,781 | A | 3/1962 | Bossi | |
| 3,233,535 | A | 2/1966 | Fowlie | |
| 3,566,770 | A | 3/1971 | Crossley | 99/289 |
| 3,654,852 | A | 4/1972 | Rosan, Sr. | |
| 3,812,773 | A | 5/1974 | Hultsch | 99/290 |
| 3,822,013 | A | 7/1974 | Van Der Veken | 206/233 |
| 3,967,546 | A | 7/1976 | Cailliot | 99/286 |
| 3,985,069 | A | 10/1976 | Cavalluzzi | 99/295 |
| 4,136,202 | A * | 1/1979 | Favre | 426/77 |
| 4,426,919 | A | 1/1984 | Rhoten | 99/289 |
| 4,464,982 | A | 8/1984 | Leuschner et al. | 99/287 |
| 4,473,002 | A | 9/1984 | Leuschner et al. | 99/302 |
| 4,545,296 | A | 10/1985 | Ben-Shmuel | 99/289 |
| 4,584,101 | A | 4/1986 | Kataoka | 201/474 |
| 4,806,375 | A | 2/1989 | Favre | 426/433 |
| 4,846,052 | A * | 7/1989 | Favre et al. | 99/295 |
| 4,859,337 | A | 8/1989 | Woltermann | 210/474 |
| 4,962,693 | A | 10/1990 | Miwa et al. | 99/289 |
| 5,047,252 | A | 9/1991 | Liu et al. | 426/79 |
| 5,265,517 | A | 11/1993 | Gilbert | 99/280 |
| 5,300,308 | A | 4/1994 | Louridas | 426/112 |
| 5,325,765 | A | 7/1994 | Sylvan et al. | 99/295 |
| 5,343,799 | A | 9/1994 | Fond | |
| 5,566,605 | A | 10/1996 | Lebrun et al. | 99/302 |
| 5,637,335 | A | 6/1997 | Fond et al. | 426/84 |
| 5,649,472 | A | 7/1997 | Fond et al. | 99/295 |
| 5,656,311 | A | 8/1997 | Fond | |
| 5,755,149 | A | 5/1998 | Blanc et al. | 99/289 |
| 5,773,067 | A | 6/1998 | Freychet et al. | 426/506 |
| 5,826,492 | A | 10/1998 | Fond et al. | |
| 5,948,455 | A | 9/1999 | Schaeffer et al. | 426/77 |
| 6,007,853 | A | 12/1999 | Lesser | 426/77 |
| 6,607,762 | B2 | 8/2003 | Lazaris et al. | 426/79 |
| 6,777,007 | B2 | 8/2004 | Cai | 426/78 |
| 6,786,134 | B2 | 9/2004 | Green | 99/289 P |
| 6,849,285 | B2 * | 2/2005 | Masek et al. | 426/112 |
| 6,854,378 | B2 * | 2/2005 | Jarisch et al. | 99/295 |
| 7,017,775 | B2 | 3/2006 | Zettle et al. | 220/781 |
| 7,153,530 | B2 * | 12/2006 | Masek et al. | 426/77 |
| 7,216,582 | B2 | 5/2007 | Yoakim et al. | 99/295 |
| 7,325,478 | B2 | 2/2008 | Cautenet et al. | |
| 7,325,479 | B2 | 2/2008 | Laigneau et al. | |
| 7,469,627 | B2 | 12/2008 | Li | 99/286 |
| 7,569,242 | B2 | 8/2009 | Barber et al. | |
| 7,569,243 | B2 | 8/2009 | Yoakim et al. | |
| 7,770,512 | B2 | 8/2010 | Albrecht | 99/295 |
| 7,981,451 | B2 | 7/2011 | Ozanne | |
| 8,151,694 | B2 | 4/2012 | Jacobs et al. | |
| 8,327,754 | B2 | 12/2012 | Kirschner et al. | |
| 8,409,646 | B2 | 4/2013 | Yoakim et al. | |
| 8,431,175 | B2 | 4/2013 | Yoakim et al. | |
| 8,512,784 | B2 | 8/2013 | Denisart et al. | |
| 2003/0116029 | A1 * | 6/2003 | Kollep | 99/279 |
| 2003/0145736 | A1 | 8/2003 | Green | 99/280 |
| 2003/0159593 | A1 | 8/2003 | Leutwyler | |
| 2004/0255790 | A1 | 12/2004 | Green | |
| 2005/0150390 | A1 * | 7/2005 | Schifferle | 99/295 |
| 2005/0188854 | A1 | 9/2005 | Green et al. | |
| 2006/0003075 | A1 | 1/2006 | Meador | |
| 2006/0110507 | A1 * | 5/2006 | Yoakim et al. | 426/433 |
| 2006/0196364 | A1 * | 9/2006 | Kirschner | 99/295 |
| 2006/0236871 | A1 | 10/2006 | Ternite et al. | 99/295 |
| 2007/0079708 | A1 | 4/2007 | Li | 99/279 |
| 2007/0248734 | A1 | 10/2007 | Denisart et al. | |
| 2007/0289453 | A1 * | 12/2007 | Halliday et al. | 99/295 |
| 2008/0014860 | A1 | 1/2008 | Heitman et al. | |
| 2008/0038414 | A1 | 2/2008 | Vecuaba I, Membrado et al. | |
| 2008/0187638 | A1 | 8/2008 | Hansen | |
| 2009/0032454 | A1 | 2/2009 | Rapparini | 210/337 |
| 2009/0050540 | A1 | 2/2009 | Imai et al. | |
| 2009/0136639 | A1 | 5/2009 | Doglioni Majer | 426/431 |
| 2009/0155422 | A1 | 6/2009 | Ozanne | 426/89 |
| 2010/0024658 | A1 | 2/2010 | Jacobs et al. | |
| 2010/0064899 | A1 | 3/2010 | Aardenburg | 99/295 |
| 2010/0108541 | A1 * | 5/2010 | Roberto | 206/5 |
| 2010/0173056 | A1 | 7/2010 | Yoakim et al. | 426/433 |
| 2010/0176004 | A1 | 7/2010 | Schneider et al. | 205/687 |
| 2010/0178392 | A1 | 7/2010 | Yoakim et al. | 426/80 |
| 2010/0178404 | A1 | 7/2010 | Yoakim et al. | 426/431 |
| 2010/0186599 | A1 | 7/2010 | Yoakim et al. | 99/295 |
| 2010/0203198 | A1 | 8/2010 | Yoakim et al. | 426/80 |
| 2010/0203208 | A1 | 8/2010 | Yoakim et al. | 426/431 |
| 2010/0239734 | A1 | 9/2010 | Yoakim et al. | 426/433 |
| 2011/0052761 | A1 | 3/2011 | Yoakim et al. | 426/77 |
| 2011/0189362 | A1 | 8/2011 | Denisart et al. | 426/433 |
| 2011/0217421 | A1 | 9/2011 | Perentes et al. | 426/80 |
| 2011/0244099 | A1 | 10/2011 | Perentes et al. | 426/431 |
| 2011/0262601 | A1 | 10/2011 | Manser et al. | |
| 2012/0058226 | A1 | 3/2012 | Winkler et al. | |

FOREIGN PATENT DOCUMENTS

| | | |
|---|---|---|
| CN | 101001555 | 7/2007 |
| CN | 101001555 A1 | 7/2007 |
| DE | 2151920 A1 | 4/1973 |
| DE | 32 41 606 | 3/1984 |
| DE | 35 29 053 | 2/1987 |
| DE | 35 29 204 | 2/1987 |
| DE | 37 19 962 | 6/1988 |
| DE | 42 40 429 | 6/1994 |
| DE | 44 39 252 | 5/1996 |
| DE | 10355671 A1 | 6/2004 |
| DE | 10 2005 007 852 | 8/2006 |
| EP | 0242556 A1 | 10/1987 |
| EP | 0521510 A1 | 10/1987 |
| EP | 0 250 810 A1 | 1/1988 |
| EP | 0 367 600 | 5/1990 |
| EP | 0 512 470 A1 | 11/1992 |
| EP | 0 521 510 | 1/1993 |
| EP | 0521187 A1 | 1/1993 |
| EP | 0 607 759 | 7/1994 |
| EP | 0 651 963 | 5/1995 |
| EP | 0 749 713 | 12/1996 |
| EP | 0 806 373 B1 | 11/1997 |
| EP | 1208782 B1 | 5/2002 |
| EP | 1 299 022 B1 | 4/2003 |
| EP | 1 654 966 B1 | 5/2006 |
| EP | 1 774 878 | 4/2007 |
| EP | 1 813 333 A2 | 8/2007 |
| EP | 2 000 062 A1 | 12/2008 |
| EP | 2155021 B1 | 3/2011 |
| FR | 2 132 310 | 11/1972 |
| FR | 2 487 661 | 2/1982 |
| FR | 2 513 106 | 3/1983 |
| FR | 2 531 849 | 2/1984 |
| FR | 2 535 597 | 5/1984 |
| FR | 2 617 389 | 1/1989 |
| FR | 2 624 364 | 6/1989 |
| FR | 2 685 186 | 6/1993 |
| FR | 2 686 007 | 7/1993 |
| FR | 2 726 988 | 5/1996 |
| GB | 1 506 074 A | 4/1978 |
| GB | 2 416 480 | 4/1985 |
| GB | 2 227 405 A | 8/1990 |
| GB | 2 253 336 | 9/1992 |
| GB | 2 416 480 A | 2/2006 |
| JP | 50016225 A | 2/1975 |
| JP | FR2617389 A | 2/1975 |
| JP | 62254719 A | 11/1987 |
| JP | 63034581 U | 3/1988 |
| JP | 02124111 A2 | 5/1990 |
| JP | 02189114 A2 | 7/1990 |
| JP | 06339431 A2 | 12/1994 |
| JP | 59-82817 A | 5/1995 |

(56) References Cited

FOREIGN PATENT DOCUMENTS

| | | |
|---|---|---|
| JP | 3034606 | 2/1997 |
| JP | 2001061663 A2 | 3/2001 |
| JP | 2002189115 A | 7/2002 |
| JP | 2002215414 A | 8/2002 |
| JP | 2003144973 A2 | 5/2003 |
| JP | 2004517654 A | 6/2004 |
| JP | 2005516602 | 6/2005 |
| JP | 2005199071 A2 | 7/2005 |
| JP | 2005525146 A | 8/2005 |
| JP | 2006515764 A | 6/2006 |
| JP | 2006518226 A | 8/2006 |
| JP | WO2007042414 A | 4/2007 |
| TW | 200718383 | 5/2007 |
| WO | WO 94/02059 A1 | 2/1994 |
| WO | WO 02/17760 A1 | 3/2002 |
| WO | WO0217760 | 3/2002 |
| WO | WO 02/35977 A1 | 5/2002 |
| WO | WO2004/030500 A1 | 4/2004 |
| WO | WO2005/066040 A2 | 7/2005 |
| WO | WO 2006/082064 A1 | 8/2006 |
| WO | WO 2006/112691 | 10/2006 |
| WO | WO2007/014584 A1 | 2/2007 |
| WO | WO 2007/041954 | 4/2007 |
| WO | WO 2007/085921 A2 | 8/2007 |
| WO | WO 2007/110768 A2 | 10/2007 |
| WO | WO 2008/087099 A2 | 7/2008 |
| WO | WO 2008/148601 A1 | 12/2008 |
| WO | WO 2008/148604 | 12/2008 |
| WO | WO 2008/148646 | 12/2008 |
| WO | WO 2008/148650 | 12/2008 |
| WO | WO 2008/148656 | 12/2008 |
| WO | WO 2008/148834 | 12/2008 |
| WO | WO 2009/050540 A1 | 4/2009 |
| WO | WO 2009/106175 A1 | 9/2009 |
| WO | WO 2009/106598 A1 | 9/2009 |
| WO | WO 2009/133134 A1 | 11/2009 |
| WO | WO 2010/026045 A1 | 3/2010 |
| WO | WO 2010/026053 A1 | 3/2010 |
| WO | WO 2010/038213 A2 | 4/2010 |
| WO | WO 2010/041179 A2 | 4/2010 |

OTHER PUBLICATIONS

International Search Report mailed Feb. 8, 2010 for Application No. PCT/EP2009/060771 filed Aug. 20, 2009.
U.S. Appl. No. 12/602,542, filed Dec. 1, 2009.
U.S. Appl. No. 12/602,553, filed Dec. 1, 2009.
U.S. Appl. No. 12/602,562, filed Dec. 1, 2009.
U.S. Appl. No. 12/602,568, filed Dec. 1, 2009.
U.S. Appl. No. 12/602,577, filed Dec. 1, 2009.
U.S. Appl. No. 12/602,730, filed Dec. 2, 2009.
U.S. Appl. No. 12/776,155, filed May 7, 2010.
U.S. Appl. No. 13/061,558, filed Mar. 1, 2011.
U.S. Appl. No. 13/061,567, filed Mar. 1, 2011.
Non Final Office Action, U.S. Appl. No. 12/602,577, dated Mar. 20, 2012.
Non Final Office Action, U.S. Appl. No. 12/602,562, dated Feb. 13, 2012.
Final Office Action, U.S. Appl. No. 12/602,562, dated Jun. 22, 2012.
Non Final Office Action, U.S. Appl. No. 12/602,542, dated Apr. 13, 2012.
Non Final Office Action, U.S. Appl. No. 12/602,730, dated May 17, 2012.
Non Final Office Action, U.S. Appl. No. 12/860,705, dated Mar. 16, 2012.
Restriction Requirement, U.S. Appl. No. 12/602,553 dated May 11, 2012.
Non Final Office Action, U.S. Appl. No. 12/602,568, dated Mar. 20, 2012.
Green Mountain Coffee, New K-Cup Samplers Offer More Variety; Jul. 11, 2008, pp. 1-5. Accessed Mar. 6, 2012 from http://www.greenmountincafe.com/2008/07/new-k-cup-samplers-offer-more-variety/.
Chilean Patent Application No. CL-1652-2008, filed Jun. 5, 2008 (English in U.S. equivalent 2010/0173056 and WO2008/148601).
Chilean Patent Application No. CL-1653-2008, filed Jun. 5, 2008 (English in U.S. equivalent 2010/0186599 and WO2008/148604).
Chilean Patent Application No. CL-1655-2008, filed Jun. 5, 2008 (English in U.S. equivalent 2010/0178404 and WO2008/148646).
Non Final Office Action, U.S. Appl. No. 12/776,155, dated Jul. 18, 2012.
Final Office Action, U.S. Appl. No. 12/602,568, dated Jul. 16, 2012.
Final Office Action, U.S. Appl. No. 12/602,577, dated Jul. 20, 2012.
Final Office Action, U.S. Appl. No. 12/860,705, dated Jul. 18, 2012.
Non Final Office Action, U.S. Appl. No. 13/061,558, dated Dec. 6, 2012.
Final Office Action, U.S. Appl. No. 12/602,542, dated Oct. 4, 2012.
Final Office Action, U.S. Appl. No. 12/602,730, dated Sep. 18, 2012.
Non Final Office Action, U.S. Appl. No. 12/602,553, dated Aug. 23, 2012.
Non Final Office Action, U.S. Appl. No. 12/602,568, dated Jul. Oct. 19, 2012.
U.S. Appl. No. 12/860,705, filed Aug. 20, 2010.
Restriction Requirement U.S. Appl. No. 13/133,613 dated Mar. 28, 2013.
Final Office Action, U.S. Appl. No. 12/602,553, dated Apr. 11, 2013.
Notice of Allowance U.S. Appl. No. 12/776,155 dated Mar. 1, 2013.
Notice of Allowance U.S. Appl. No. 12/602,568 dated Feb. 1, 2013.
Final Office Action, U.S. Appl. No. 13/061,558 dated May 21, 2013.
Non-Final Office Action, U.S. Appl. No. 13/061,567 dated May 10, 2013.
Advisory Action, U.S. Appl. No. 12/602,577 dated Oct. 11, 2012.
Non-Final Office Action, U.S. Appl. No. 13/602,542 dated Jun. 18, 2013.
Advisory Action, U.S. Appl. No. 12/602,730 dated Jan. 18, 2013.
Written Opinion of the International Searching Authority and International Search Report, PCT/EP2008/056968, mailed Oct. 7, 2008.
Written Opinion of the International Searching Authority and International Search Report, PCT/EP2008/054401, mailed Sep. 11, 2008.
Written Opinion of the International Searching Authority and International Search Report, PCT/EP2008/056310, mailed Oct. 8, 2008.
Written Opinion of the International Searching Authority and International Search Report, PCT/EP2008/056345, mailed Oct. 1, 2008.
Written Opinion of the International Searching Authority and International Search Report, PCT/EP2008/056412, mailed Sep. 11, 2009.
Written Opinion of the International Searching Authority and International Search Report, PCT/EP2008/054810, mailed Oct. 24, 2008.
European Search Report, EP 09174573.7, mailed Apr. 9, 2010.
Response to Restriction, U.S. Appl. No. 13/133,613, dated Mar. 28, 2013.
Non Final Office Action, U.S. Appl. No. 13/133,613, dated Jul. 18, 2013.
Non Final Office Action, U.S. Appl. No. 12/856,369, dated Jul. 30, 2013.
Non-Final Office Action, U.S. Appl. No. 12/602,577 dated Nov. 1, 2013.
Non-Final Office Action, U.S. Appl. No. 12/602,730 dated Dec. 17, 2013.
Restriction Requirement, U.S. Appl. No. 12/856,369 dated Feb. 15, 2013.
Notice of Allowance, U.S. Appl. No. 13/061,567 dated Jun. 11, 2013.

* cited by examiner

CAPSULE FOR THE PREPARATION OF A COFFEE EXTRACT HAVING A STRUCTURE FACILITATING PERFORATION FOR INJECTION OF WATER

BACKGROUND

The present invention relates to a capsule for the preparation of a coffee extract from coffee contained in the capsule by hot water injected under pressure in the capsule using a water injection device having perforating blades. The invention also relates to a system of capsule comprising the capsule of the invention associated to a water injection device in a beverage production device.

The background of the present invention is the field of capsules which contain beverage or other comestible ingredients. By means of an interaction of these ingredients with a liquid, a beverage such as coffee, tea or other comestibles, such as for example soup, can be produced. The interaction can be based on the principle of extraction of a beverage-forming substance, the mixing or the dissolution, in presence of a liquid diluent such as water.

The capsule of the invention is more particularly adapted to contain ground coffee in order to produce a coffee beverage by injecting hot water under pressure into the capsule and obtaining a coffee beverage from the capsule.

Systems and methods for obtaining fluid comestibles from substances containing capsules are for example known from European patent application EP 512 470 A. Therefore, the capsules are closed by walls, preferably liquid impermeable walls including an inlet wall which is pierced only during use, for injection of water, for example, when the capsule is introduced in the device.

An improvement in these systems and methods consists in providing an injection device comprising a series of blades separated from the central injection conduit as described in European patent EP 12 99 022 B1. A better flow distribution is obtained as compared to a central perforation obtained by a single injection needle. Such device works properly with a capsule body made of thin aluminum because that material tends to perforate easily due to its mechanical properties. Furthermore, the perforations can be well dimensionally and geometrically defined and therefore they provide a good flow distribution across the bed of ingredients in the capsule. However, the known embodiments suffer the disadvantage that certain capsules made of more elastic materials such as polymers can be difficult to pierce in a repeated manner and the resulting perforations are not so well dimensionally and geometrically defined. This is especially true for capsules comprising plastic walls or biodegradable polymers, as the material can be relatively difficult to pierce and the piercing members of the device may become blunt relatively rapidly. Therefore, new capsules can no longer be pierced correctly, i.e., they are pierced partially or insufficiently thereby providing poor flow distribution of liquid in the capsule which affects the quality of extraction and the qualities of the liquid food that is produced. The beverage preparation device may also have to be returned to a service or maintenance station for repairing or replacing the piercing members which have been damaged.

The present invention aims at solving this problem by providing a capsule which is more easy perforable for ensuring a good quality of extraction and which does not damage the injection devices of the existing art or of existing beverage preparation devices.

WO2010/041179 relates to a capsule for preparing a beverage with an upper wall comprising on its internal surface a weakening zone adapted to be displaced when an external element exerts a force thereon.

Despite the foregoing, further improvements are needed and these are now provided by the present invention.

SUMMARY OF THE INVENTION

A capsule containing a comestible ingredient for preparing a liquid food when contacting water injected under pressure into the capsule by a water injection device. The capsule comprises a frusto-conical body comprising a rim, a sidewall, an inlet wall for receiving water from the blades of an injection device, and a lower delivery wall sealed to the rim of the body. It also has an interior cavity containing a predosed amount of beverage forming ingredients. The inlet wall comprises a continuous or discontinuous annular portion configured, positioned and arranged for facilitating penetration of blades belonging to the injection device therethrough, and which portion extends on a substantially circular path of predetermined radius $R1$ at least equal to radius $R2$ of the circular path along which the blades of the injection device extend.

The inlet wall generally has a flat or convex shape and the annular portion advantageously has a width that is greater than that of the blades. Numerous variations of the annular portion are disclosed herein. These include one: (a) having a wall thickness that is less than that of the sidewall, (b) that is a recess having sides and a base that is sufficiently deep such that the blades do not contact the base of the recess; (c) that is made of a material that is more easy to penetrate than that of the sidewall, (d) that is made of a material that is flexible and can be deformed by the blades upon contact thereby; and (e) that is scored or otherwise provided with weakened areas. All of these designs are intended to facilitate the introduction of the blades of the water injection device in a way to avoid wear of the blades and thus maximize fluid flow into the capsule and the useful like of the water injection device and liquid food preparation unit.

The annular portion may form a continuous recess having sides and a base facing outwardly or inwardly. It also may comprise a plurality of discontinuous recesses or score lines. Furthermore, the annular portion may comprise a continuous or discontinuous embossment. In another arrangement, the annular portion has a locally reduced thickness of the inlet wall compared to the thickness of side wall or of the inlet wall outside the annular portion. The wall thickness is preferably reduced by at least 20 to 30% compared to that of the sidewall or of the inlet wall outside the annular portion. Furthermore, the annular portion may be a recess having sides and a base and optionally one is sufficiently deep such that the blades do not contact the base of the recess and the sides include a plurality of injection holes. If desired, the recess may optionally include a gastight membrane sealed onto the inlet wall to sealingly cover the recess and the injection holes.

In another variation, the annular portion may comprise a porous membrane or filter that forms the inlet wall, sidewall and delivery wall of the capsule and is supported on a rigid skeleton comprising several legs to facilitate penetration of the membrane or filter by the blades without interference. If desired, the annular portion can extend to the entire inlet wall and have a reduced thickness compared to that of the sidewall with the capsule body further comprising inner or outer reinforcement members to ensure improved rigidity of the wall during perforation by the blades. The annular portion can be substantially free of reinforcement members to not interfere with the insertion of the blades of the water injection device.

A further embodiment of the invention relates to a beverage production device comprising a water injection device and a capsule system that includes one of the capsules disclosed herein. The water injection device comprises a series of blades for injecting water in the capsule through the inlet wall; wherein the blades are placed along a circular path of radius R2 substantially equal to the radius R1 of the annular portion of the capsule.

DETAILED DESCRIPTION OF THE PREFERRED EMBODIMENTS

Figure 1:
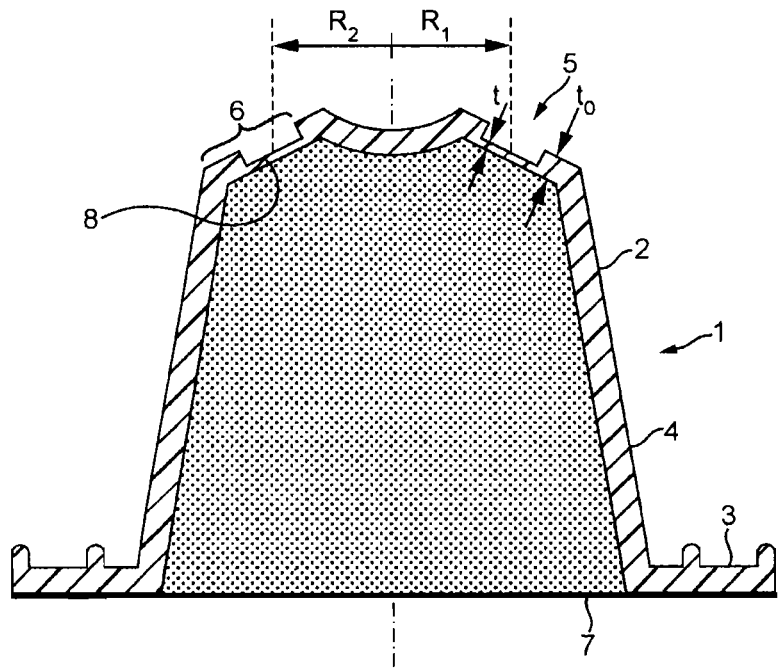
FIG. 1 shows a cross section view of a capsule according to a first embodiment of the invention.

In the description that follows, a capsule that contains roast and ground coffee is used to exemplify the invention.

In particular, the present invention relates to a capsule for the preparation of a coffee extract from coffee contained in the capsule and hot water injected under pressure in the capsule by a water injection device, the capsule comprising a frusto-conical body comprising a rim, a sidewall and an inlet wall comprising a flat or convex portion, and a lower delivery wall sealed to the rim of the body. The capsule contains a predosed amount of coffee therein. The flat or convex portion of the inlet wall has a structure in relief or in recess arranged for facilitating penetration of blades belonging to the injection device therethrough and extends on a substantially circular path of predetermined radius R1 identical to the radius R2 of the circular path along which the blades of the injection device extend.

In a first mode, the structure forms a continuous recessed circular or annular portion of radius R1. In a second mode, the structure forms a plurality of arcuated recessed portions of radius R1. In a third mode, the structure forms a continuous circular or annular embossing of radius R1. The advantage of an embossed structure is essentially to increase the local rigidity around the structure to facilitate perforation. In a fourth mode, the structure forms a plurality of discontinuous embossed portions extending along a circular path of radius R1.

In general, the structure preferably forms a locally reduced thickness of the inlet wall compared to the thickness of inlet wall outside the structure. As a result, the perforation resistance decreases in the structure compared to the other part of the body of the capsule which so facilitates piercing by the blades but also provide better geometrically and dimensionally defined perforations.

In a fifth mode, the structure comprises an annular recessed portion of radius R1 comprising a plurality of injection holes and a gastight membrane sealed onto the inner wall to sealingly cover the injection holes.

In all the preceding modes, the body is preferably formed of a self-standing integrally moulded cup-shaped piece forming at least the inlet wall and side wall and preferably the rim as well.

In a sixth mode, the structure is formed by a porous membrane or one or more filters supported onto a rigid skeleton. The skeleton can form several legs separating porous portions forming the structure facilitating penetration of the blades.

In a seventh mode, the structure forms one or more weakened lines. The lines can be distributed as a circle as in the first embodiment or preferably as a series of lines oriented transversally and distributed along a circular path of radius R1. More preferably, the lines are obtained by reducing thickness of the inlet wall such as by laser or mechanical scoring.

In an eighth mode, the structure is obtained by the inlet wall which is of reduced thickness compared to the side wall of the capsule.

The invention also relates to a capsule for the preparation of a coffee extract from coffee contained in the capsule and hot water injected under pressure in the capsule by a water injection device. This capsule comprises a frusto-conical body comprising a rim, a sidewall, an inlet wall, and a lower delivery wall sealed to the rim of the body. The capsule contains a predosed amount of coffee in the capsule. The inlet wall has a structure arranged for facilitating penetration of blades belonging to the injection device in the form of a reduced thickness, compared to the thickness of the side wall, at least in a radius equal to the radius of the circular path along which the blades of the injection device extend.

In this embodiment, the body is preferably a self-standing, integrally moulded piece extending by the flange-like rim. The reduction of thickness of the inlet wall can extend from the central axis of the capsule to or towards the junction of side wall. The inlet wall of reduced thickness may also comprise (inner and/or outer) reinforcement members extending locally on the inlet wall to ensure an improved rigidity of the wall during perforation by the blades. The reinforcement members can extend radially as a plurality of narrow ridges and/or concentrically around the central axis of the inlet wall. Preferably, the reinforcement members extend both on the inlet wall and side wall of the body, e.g., as narrow radially extending ridges.

The predefined circular line of radius R1 corresponding to the circular line of radius R2 for extension of the blades is substantially free of reinforcement member. By "substantially free", it is meant here that at least 80%, more preferably at least 95%, of the perimeter of the radius line is not covered by the reinforcement member(s). Preferably, the concentrically extending ridge(s) forming reinforcing members extends outside the circular line of radius (R1).

In all embodiments, the frusto-conical body can be made of polymer material. Preferably, the frusto-conical body comprises polypropylene or polyethylene. In an alternative, the frusto-conical body can also comprise a biodegradable material. For instance, the frusto-conical body comprises cellulose, starch-based material or polylactic acid (PLA).

In an alternative, the structure of reduced thickness is formed of a material different from the material of the body outside of the structure. More specifically, the structure can be formed of a plastic or aluminum foil which is embedded or sealed or connected otherwise with the side wall of the body.

The delivery wall can be a membrane that perforates under the effect of the pressure building in the capsule against a capsule holder comprising perforating elements such as described in detail in EP 512 470. Preferably, the delivery wall is a thin aluminum, thin polymer or combination thereof. In a preferred example, the delivery wall is an aluminum foil of about 20-100 microns.

The delivery wall can also be a permeable wall such as a plastic filter membrane, a paper filter or a filter made of other biodegradable material. The delivery wall is sealingly connected to the bottom surface of the rim of the body such as heat or ultrasonic welding.

The rim can comprise sealing means which forms at least one integral protrusion or lip extending from the rim or which is an added seal element such as rubber, soft plastic, foam or fibers. The sealing means can be formed by a thickness of material that softens when it is compressed under the compressive forces of the device and/or softens by the liquid at the temperature of injection in the capsule. The sealing means can be integral with the body of the capsule, i.e., made of the same material. For instance, it can be a biodegradable material comprising starch and optionally constituents chosen amongst: at least one biodegradable resin, fibers, proteins, lipids and combination thereof.

Regarding the critical dimensions and geometry of the capsule, the radius R1 of the structure is preferably comprised between 4 and 12 mm, most preferably between 6 and 9 mm. The inlet wall has preferably a diameter comprised between 22 and 25 mm. The delivery wall of the capsule has preferably a diameter between 30 and 40 mm. The body of the capsule has preferably a height comprised between 27 and 30 mm. The rim of the capsule has preferably a width comprised between 3 and 5 mm. For improving perforation of the capsule, the inlet wall has a convex portion forming an angle of between 5 and 40 degrees relative to the plane passing by the flange-like rim of the body.

The present invention also relates to a capsule system comprising the capsule of the invention associated to a water injection device in a beverage production device comprising a series of blades for injecting water in the capsule through the inlet wall; wherein the blades are placed along a circular path of radius R2 substantially equal to the radius R1 along which the structure in relief or recess extends. Preferably, the water injection device comprises three blades evenly distributed along the circular path of radius R2 for ensuring an even distribution of water in the capsule through the bed of ingredient, e.g., ground coffee.

Figure 2:
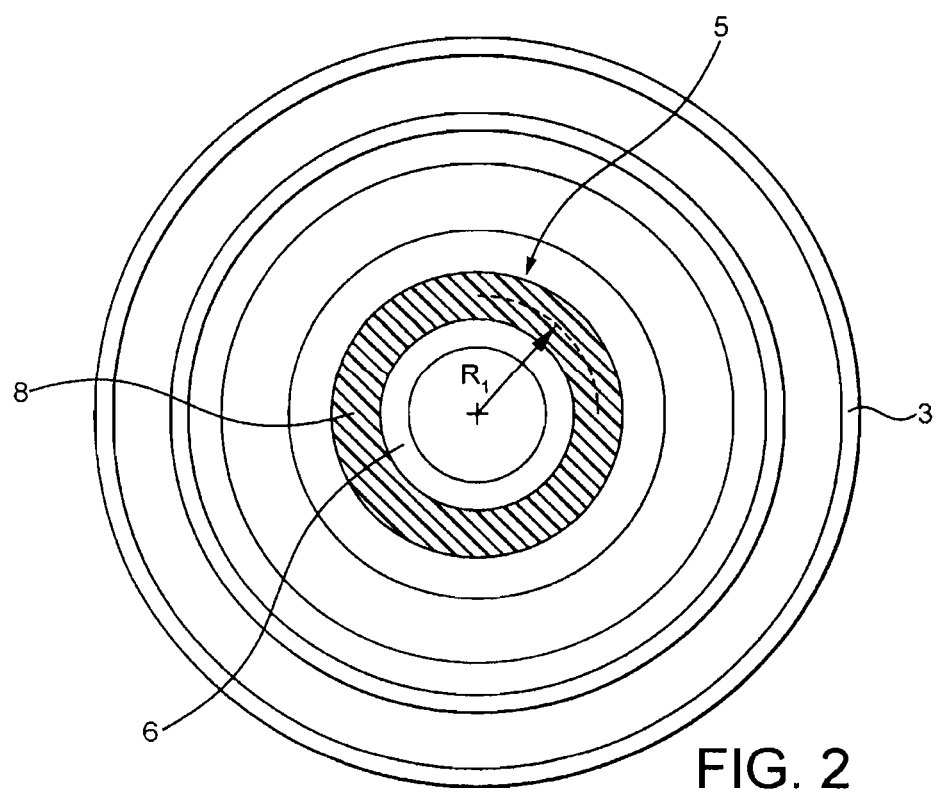
FIG. 2 shows a top view of the capsule of FIG. 1.

A first preferred embodiment of the capsule is illustrated in FIGS. 1 and 2. The capsule 1 is for the preparation of a coffee extract from the coffee contained in the capsule when hot water is injected under pressure into the capsule by a water injection device 50 shown in FIGS. 4 and 10.

Figure 4:
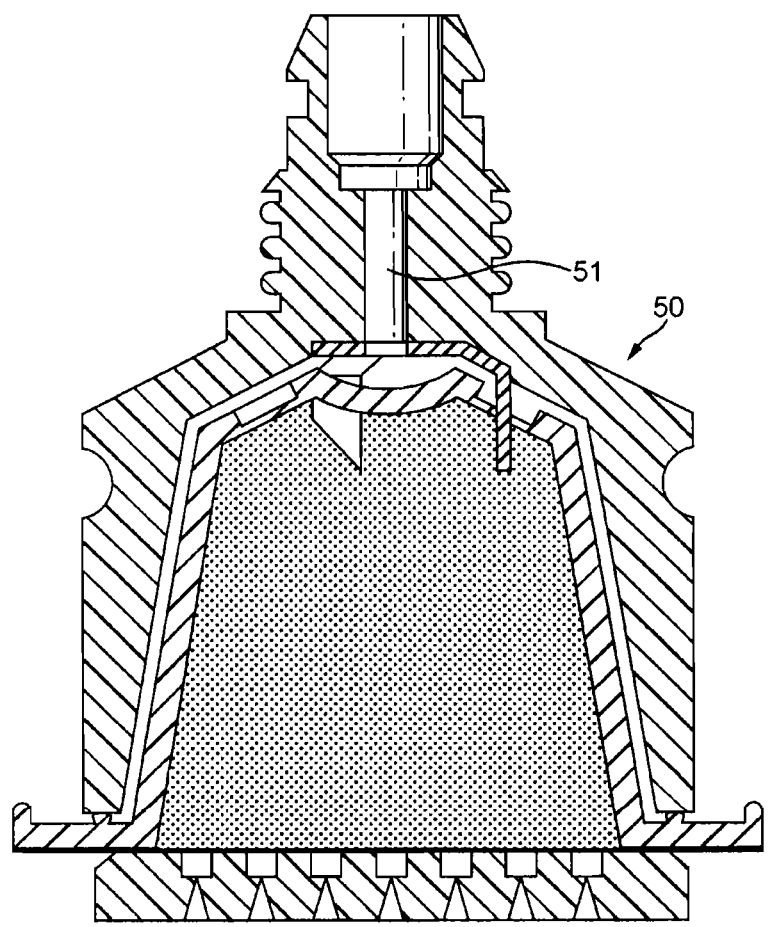
FIG. 4 shows a cross section view of a capsule of FIG. 1 when perforated by the injection device of the beverage preparation device.
Figure 10:
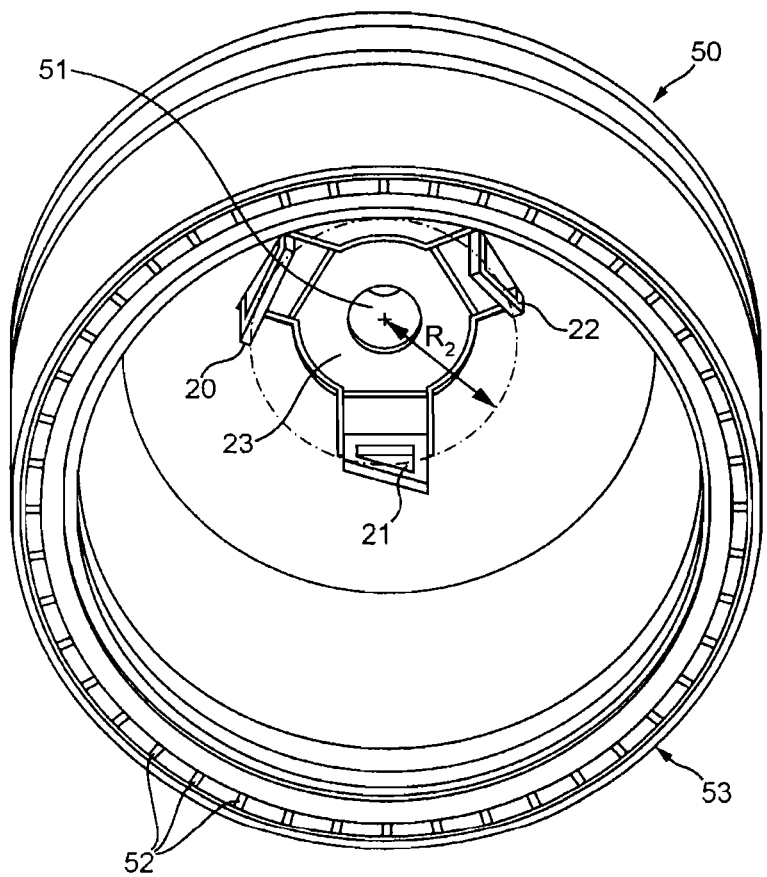
FIG. 10 is a bottom perspective view of a water injection device.

The injection device of FIGS. 4 and 10 is formed of an interior opening for receiving the capsule, generally termed a capsule cage, and comprises a series of blades 20, 21, 22 placed along a circular pattern of radius R2. In the center of the upper portion of the cage is provided a liquid injection conduit 51 for supplying water under pressure into the cage.

The capsule of the invention comprises a frusto-conical body 2 comprising a rim 3, a sidewall 4 and an inlet wall 5. The inlet wall comprises a portion 6 that is flat or convex. The capsule further comprises a lower delivery wall 7 sealed to the rim 3 of the body. The capsule comprises a predosed amount of a comestible or beverage forming ingredient in the capsule, e.g., roast and ground coffee.

The flat or convex portion 6 has a annular structure 8 in recess arranged for facilitating penetration of the blades 20, 21, 22 of the injection device 50. The structure 8 extends on a substantially circular path of predetermined radius R1 substantially equal to the radius R2 of the circular path along which the blades 20, 21, 22 of the injection device extend.

In the embodiment of FIGS. 1 and 2, the structure forms a continuous recessed circular or annular portion 8 of radius R1. As a result, regardless of the capsule rotational positioning relative to the injection device 50, the blades always enter in the recessed circular or annular portion 8. Furthermore, the structure 8 forms a locally reduced thickness t of the inlet wall 5 compared to the thickness $t_0$ of the inlet wall or side wall of the body outside the structure. While the embodiment of FIGS. 1 and 2 show the reduced thickness wall as a recess, the reverse structure can be used wherein the recess faces the interior of the capsule such that the inlet wall 6 of the capsule appears uniformly flat or convex as in the adjacent structure. Also, a continuous circular embossing of radius R1 extending along a circular path of radius R1 can be used. Although these structures 8 facilitates perforation due to the reduced or decreased wall thickness, the capsule remains closed and coffee powder cannot escape out of the capsule during storage.

Figure 3:
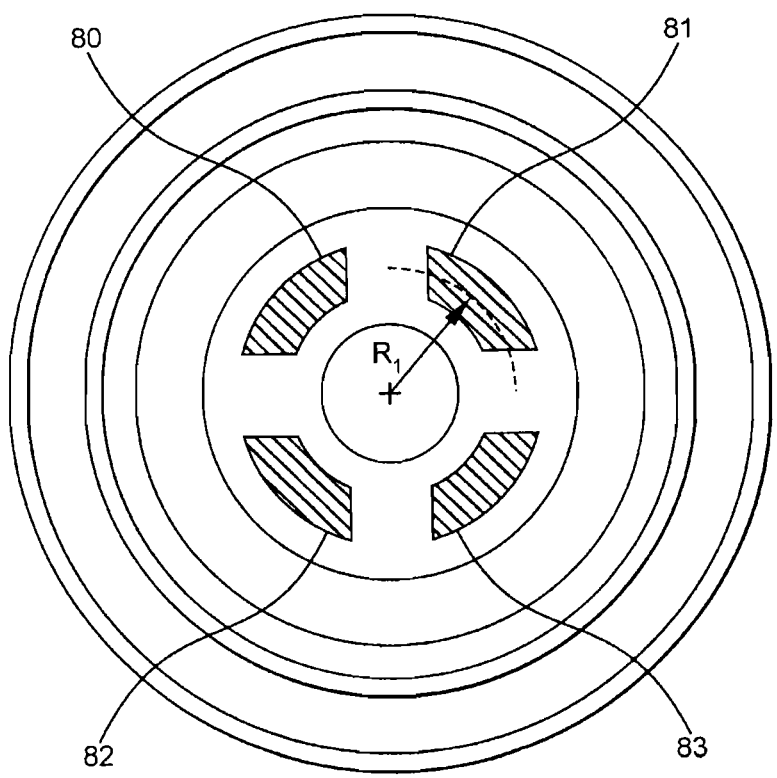
FIG. 3 shows a top view of the capsule of FIG. 1 according to a second embodiment.

FIG. 3 illustrate a second embodiment of the capsule of FIG. 1 in which the structure forms a plurality of recessed portions 80, 81, 82, 83 placed along a circular path of radius R1. The portions can be arcuated or rectilinear. Therefore, instead of a continuous annular structure, the structure is discontinuous and forms several discrete portions, extending along radius R1 and separated by non-recessed portions of the inlet wall. The recessed portions are of reduced thickness t compared to the thickness $t_0$ outside of the structure. As above, the recess can be oriented to face the outside or inside of the capsule. The number and length of the portions 80, 81, 82, 83 are provided to ensure that the blades 20, 21, 22 will meet the structure irrespective of the position of the capsule in the injection device. While four are shown any number can be used from 2 to 12 as desired. Also, rather than a recess, a plurality of discontinuous inward facing recesses or embossed portions can instead be used.

In any of the preceding continuous or discontinuous embodiments, the reduction of thickness can be of between 30 to 90% of the thickness of the wall outside the structure. This reduction of thickness can be obtained by different means such as directly by thermoforming, blow moulding or injection moulding of the body or by moulding of the body and then laser or mechanical scoring or stamping the structure itself. As the inlet wall has no openings, the capsule remains closed by the structure of reduced thickness thereby ensuring preservation of coffee against humidity.

Figure 5:
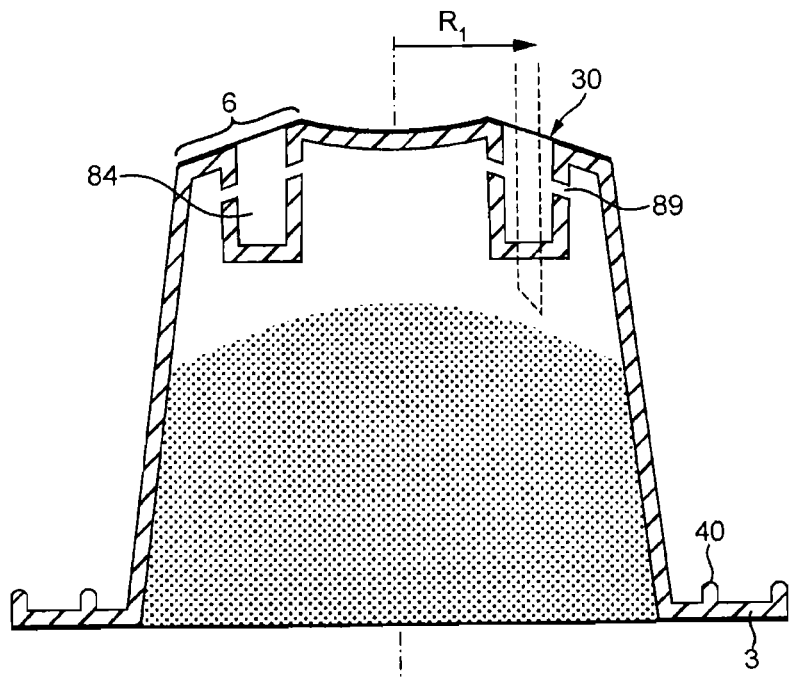
FIG. 5 is a cross section view of a capsule according to a third embodiment.
Figure 6:
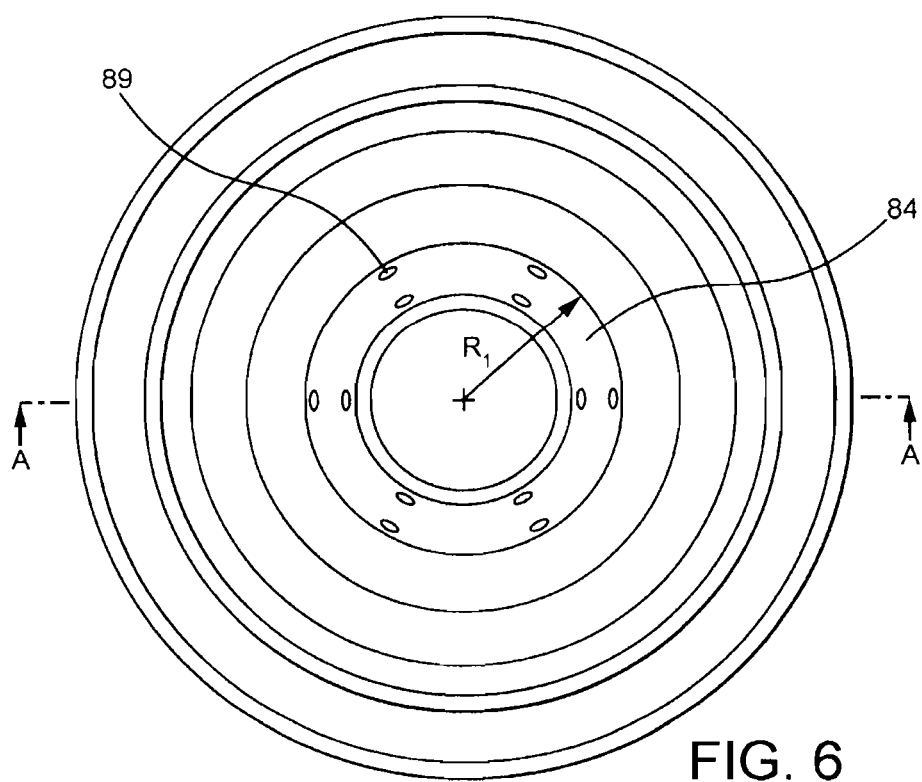
FIG. 6 is a top view of the capsule of FIG. 5.

FIGS. 5 and 6 illustrate a capsule having a deeper recess than that of FIGS. 1 and 2. This structure comprises an annular recessed portion 84 extending along radius R1. The portion 84 should be narrow enough to guide the blades during introduction of the capsule in the cage of the injection device 50. In this deeper recessed portion 84, a plurality of injection holes 89 is provided to assist and ensure an even distribution of water flow into the capsule. A gastight membrane 30 which is sealed onto the inner wall can be optionally provided to sealingly cover the portion 84 including the injection holes 89 to prevent humidity or moisture ingress into the capsule prior to use. It should be noted that the bottom of the portion 84, at least, is formed of a thickness that is less than the thickness of the inlet wall outside the portion to facilitate entry of the blades in the capsule. Alternatively, portion 84 should be configured to be deep enough to ensure that the blades are fully lodged in the recess formed by the portion without contacting the bottom of recess 84. In a further variation, portion 84 can stretch inwards under the introduction force imparted to it by the blades. All of these structures reduce the wear on the blades and facilitate the entry of water into the capsule.

Figure 7:
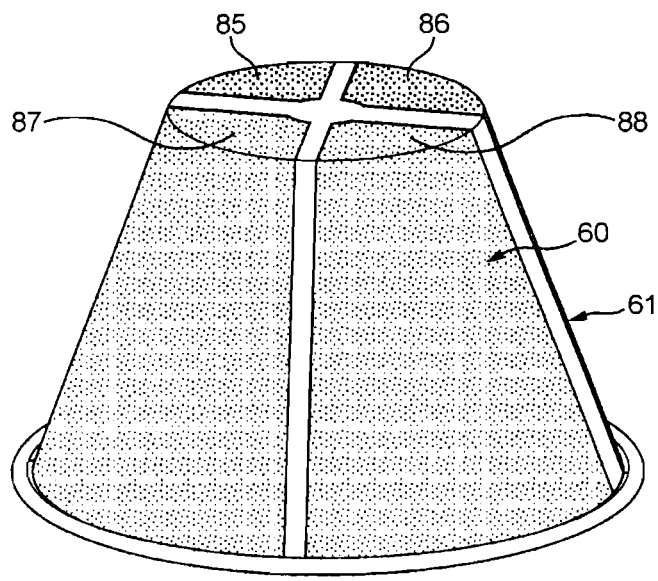
FIG. 7 is a perspective view of a capsule according to a fourth embodiment.
Figure 8:
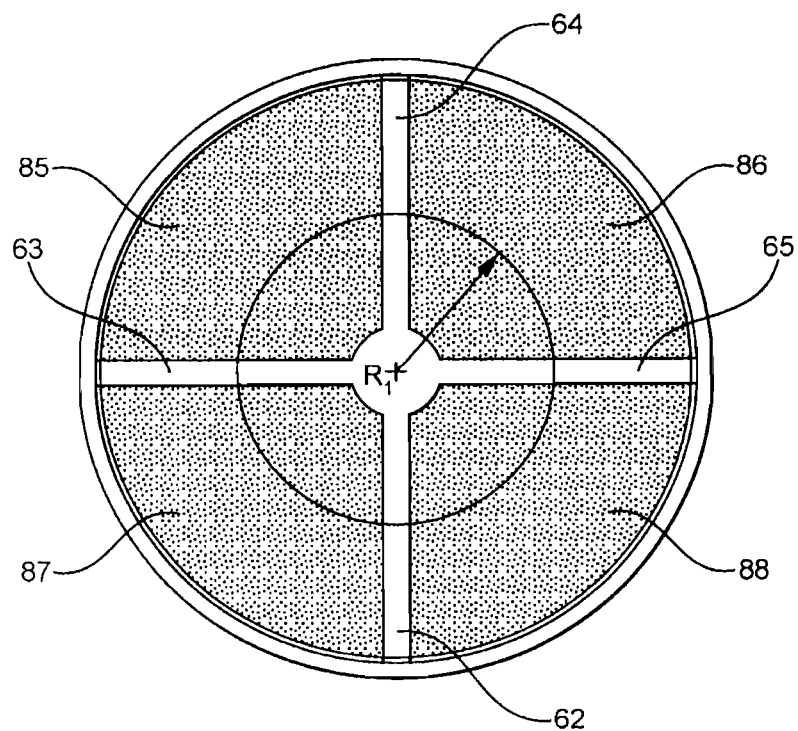
FIG. 8 is a top view of the capsule of FIG. 7.
Figure 9:
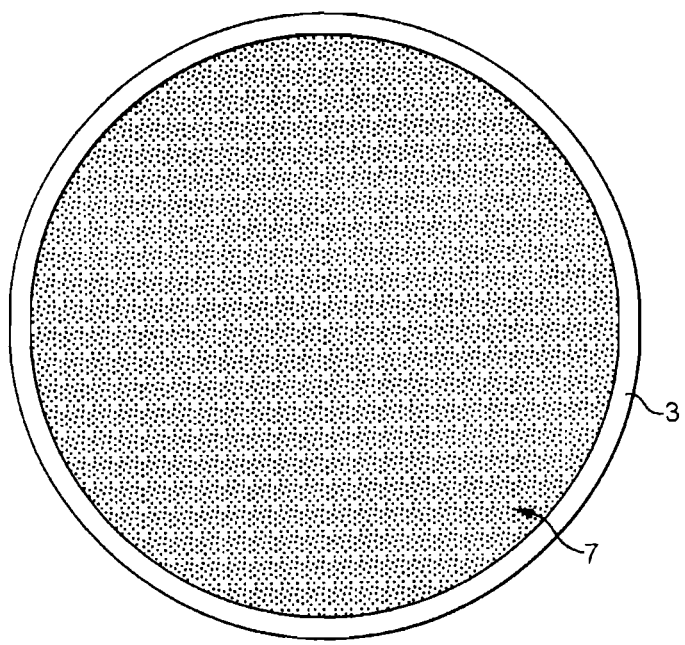
FIG. 9 is a bottom view of the capsule of FIGS. 7 and 8.

FIGS. 7 to 9 illustrate a fourth embodiment in which the structure is formed by a porous or non porous thin membrane or a filter 60 supported onto a rigid skeleton 61. The skeleton ensures the support of the membrane or filter in particular after extraction to avoid the capsule to collapse or deform when wetted by the injected water. The membrane or filter can be a paper filter or a polymer porous membrane which is non-woven or woven, for example. The membrane may also be a membrane that is not porous to the injected water such as thin polyethylene or aluminum foil. It can be supported by the skeleton which is made of a more rigid and thicker paper or cardboard or a more rigid polymer. The skeleton forms several legs 62, 63, 64, 65 separating the porous or non porous membrane or filter portions 85, 86, 87, 88 forming the structure facilitating penetration of the blades therethrough. It should be noted that penetration of the blades is not critical when the membrane is porous or when it is a filter. In such case, the material can eventually be elastic enough to stretch without being traversed by the blades. The filter can extend along the sidewall of the body. In an alternative, the filter is limited on the top wall (85, 86, 87, 88) of the capsule and the skeleton forms the entire side wall. And while the skeleton shows four legs supporting the filter, this number can be varied as desired with a corresponding reduction in the thickness of the ribs to facilitate penetration by the blades while minimizing or completely avoiding contact with the legs.

As illustrated in FIG. 9, the membrane or filter can extend and forms the lower delivery wall 7 of the capsule. The skeleton can further form the rim 3 of the capsule. In all the embodiments, the frusto-conical body can be made of polymer material or cellulose-based material (paper, cardboard) or natural fibers. If desired, the body can be made of a thin aluminum foil. In a preferred mode, the frusto-conical body comprises polypropylene or polyethylene. Alternatively, the frusto-conical body comprises a biodegradable material. In this embodiment, the frusto-conical body comprises cellulose, starch-based material or polylactic acid (PLA).

Preferably, the rim of the capsule comprises a sealing means 40 for filling radial grooves 52 formed at the end pressing surface 53 of the injection device (see FIG. 10). More preferably, the sealing means 40 forms at least one integral protrusion or lip extending from the rim or be an added seal element such as rubber, polyurethane or other elastomer, soft plastic, foam or fibers (e.g. paper, cardboard or synthetic or natural fibers).

Figure 11:
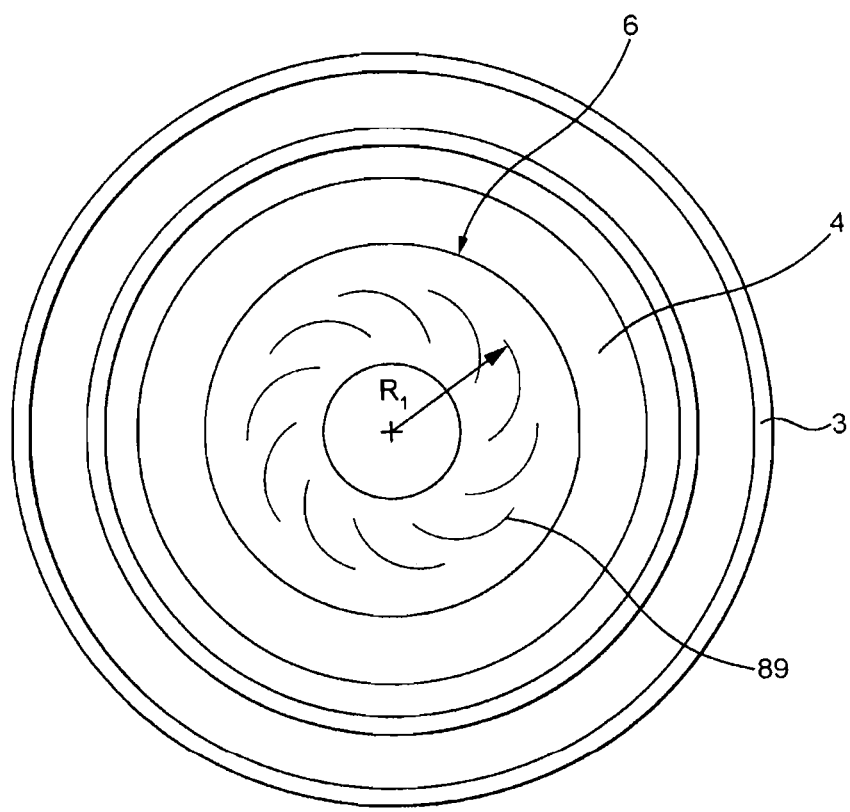
FIG. 11 is a top view of the capsule according to a fifth embodiment.

FIG. 11 shows another embodiment in which the structure at the inlet wall is formed of a series of weakened lines extending transversally to a circular path of radius R1. The lines can be discrete zones of reduced thickness such as obtained by laser or mechanical scoring.

Figure 12:
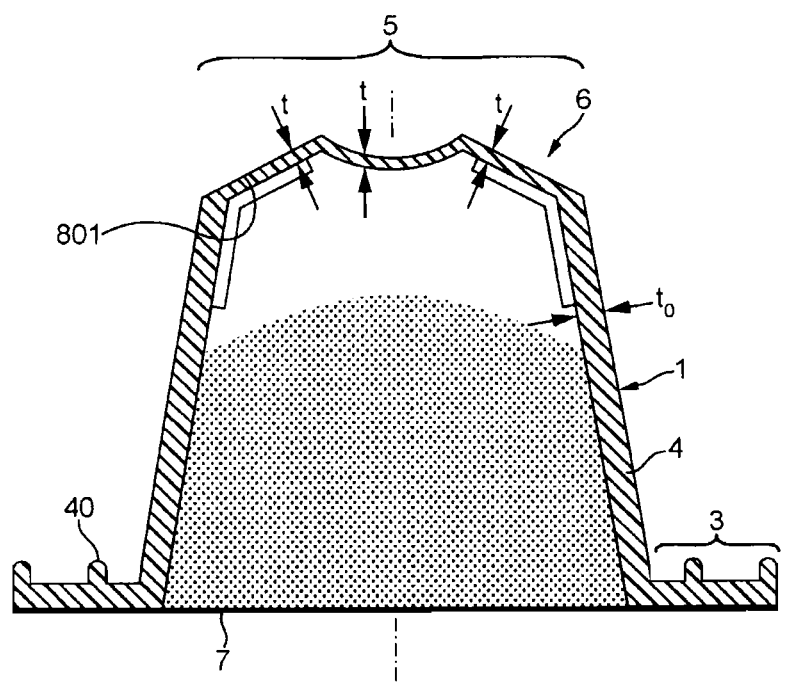
FIG. 12 is a cross sectional view of a capsule according to sixth embodiment.
Figure 13:
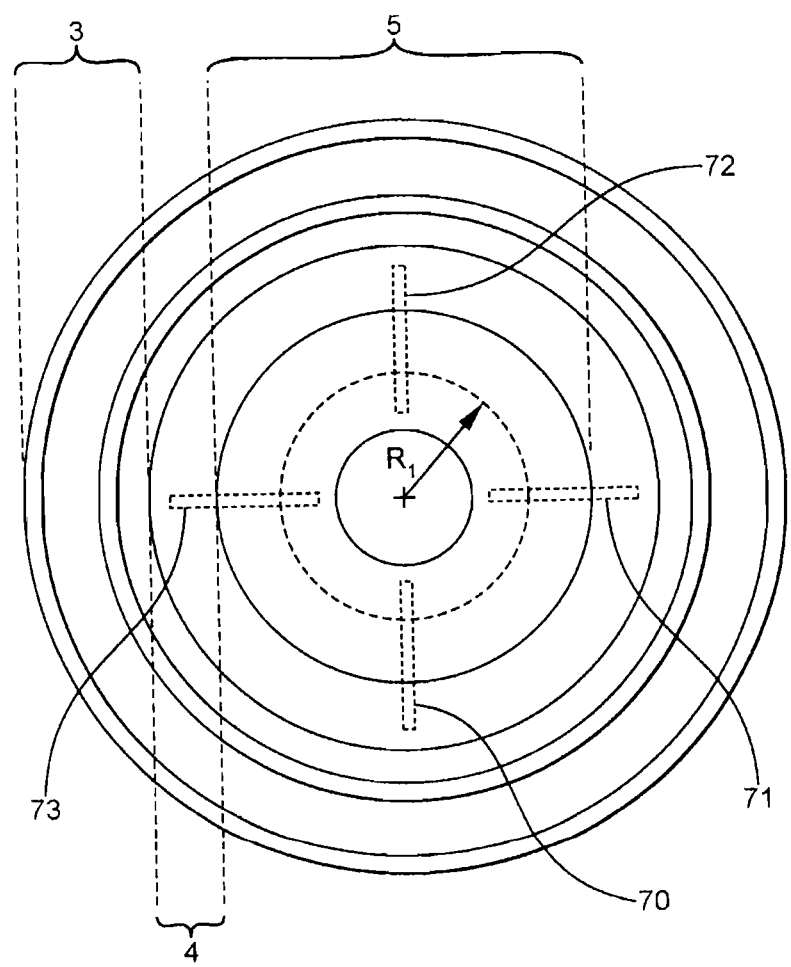
FIG. 13 is a top view of the capsule of FIG. 12.

FIGS. 12 and 13 show another embodiment of the capsule of the invention in which the inlet wall 5 and side wall 4 are formed of a self-standing, integrally moulded, cup-shaped body which comprises a structure 801 of reduced thickness "t" extending from the axial centre of the capsule to the end of the periphery of the inlet wall 5. The reduction of thickness "t" is compared to the larger thickness of the sidewall "$t_0$". Preferably, the reduction of thickness is of at least 20%, preferably at least 50% of thickness "$t_0$". The thickness of the inlet wall "t" is preferably lower than 1 mm, most preferably comprised between 0.2 and 0.8 mm. As a result the blades of the injection device are capable of perforating the inlet wall in the region of the inlet wall corresponding to radius $R_2$ in a facilitated manner. At the same time, the capsule is sufficiently rigidified by the side wall of increased thickness ($t_0$). The blades can therefore perforate the inlet at the circular line of radius (R1) corresponding to the line of radius (R2) of extension of the blade in the device without the capsule collapsing in the axial direction of the capsule.

When more rigidity is necessary depending on the specific rigidity of the polymer and/or biodegradable material, reinforcing members 70, 71, 72, 73 are provided in or on the walls 4, 5. The reinforcing members may have different lengths, e.g., with shorter ones 70, 72, to reduce the coverage along the radius R1. The reinforcing members are preferably made integral with the body by moulding (e.g., injection, thermoforming, blow-moulding, stamping, etc.) on the outer or inner surface of the body. However, reinforcing members can also be provided as elements embedded in the constituting material of the body itself such as metal or hard plastic fibers and/or wires. The reinforcing members can extend only at the inlet wall 5 but preferably they extend also at the side wall 4 for ensuring an improved axial resistance to axial deformation during perforation. In order to prevent accidental bending of the blades and/or too high resistance forces acting against the closure of the device on the capsule, the reinforcing members are substantially free in the circular line of radius R1 so as to not interfere with the insertion of the blades into the capsule.

Although illustrated for the preparation of a coffee beverage, the capsule can contain any comestible substance for the preparation of other liquid foods such as tea, fruit drinks or soup and wherein the water to be injected is hot or cold.

The preferred embodiments of the invention described herein are not intended to not limit the scope of the invention, since these embodiments are illustrations of several preferred aspects of the invention. Any equivalent embodiments are intended to be within the true spirit and scope of this invention. Indeed, various modifications of the invention in addition to those shown and described herein, such as alternate useful combinations of the elements described, will become apparent to those skilled in the art from the preceding detailed description. Such modifications are also intended to fall within the scope of the appended claims.

Finally, a number of references are cited herein, the entire disclosures of which are incorporated herein, in their entirety, by reference for all purposes to the extent necessary. Further, none of the cited references, regardless of how characterized above, is admitted as prior art to the invention of the subject matter claimed herein.

What is claimed is:

1. A capsule for the preparation of a coffee extract from coffee contained in the capsule and hot water injected under pressure in the capsule by a water injection device having blades extending along a circular path, the capsule comprising:
   a frusto-conical body comprising a rim, a sidewall and an inlet wall, the rim forms a flange;
   a lower delivery wall sealed to the rim of the body;
   a predosed amount of coffee in the capsule;
   wherein the inlet wall has a structure arranged for facilitating penetration by blades belonging to the water injection device, the structure comprises a portion of the inlet wall having a reduced thickness (t) compared to the thickness of the sidewall, the portion of the inlet wall having the reduced thickness is positioned along a radius (R1) equal to the radius (R2) of the circular path along which the blades of the water injection device extend, the structure is selected from the group consisting of (i) a continuous recessed annular portion along the radius R1, (ii) a plurality of discontinuous arcuate recessed portions along a circular path on the radius R1, and (iii) an annular recessed portion positioned along the radius R1 and comprising a plurality of injection holes and a gastight membrane sealed onto the inner wall to sealingly cover the injection holes;

wherein the body is a self-standing, integrally moulded piece extending by the rim and is made of polymer material;

wherein the inlet wall that has the reduced thickness comprises reinforcement members extending locally on the inlet wall to ensure improved rigidity during perforation by the blades;

wherein the predefined circular line of radius R1 corresponding to a circular line of radius R2 for extension of the blades of the water injection device is free of the reinforcement members; and wherein the reinforcement members are integral with the body and extend from the inlet wall to the sidewall of the body.

2. The capsule according to claim 1, wherein the portion of the inlet wall having the reduced thickness extends from a central axis of the capsule to or towards a junction of the inlet wall with the sidewall.

3. The capsule according to claim 1, wherein the reinforcement members extend radially as a plurality of ridges.

4. The capsule according to claim 2, wherein the reinforcement members extend concentrically as a plurality of ridges around the central axis of the inlet wall.

5. The capsule according to claim 4, wherein the concentrically extending ridges extend outside of the circular line of radius R1.

6. The capsule according to claim 1, wherein the frusto-conical body is made of polymer material comprising polypropylene or polyethylene.

7. The capsule according to claim 1, wherein the frusto-conical body is made of a biodegradable material.

8. The capsule according to claim 1, wherein the rim comprises sealing means.

9. The capsule according to claim 1, in combination with a beverage production device comprising a water injection device that has a series of blades for injecting water into the capsule through the inlet wall; wherein the blades are placed along a circular path of radius R2 substantially equal to the radius R1.

10. A capsule containing a comestible ingredient for preparing a liquid food when contacting water injected under pressure into the capsule by a water injection device having blades extending along a circular path, the capsule comprising:

a self-standing, integrally moulded frusto-conical body made of polymer material and comprising a rim, a sidewall and an inlet wall, the rim forms a flange;

wherein the inlet wall has a structure arranged for facilitating penetration by blades belonging to the water injection device, the structure comprises a portion of the inlet wall having a reduced thickness (t) compared to the thickness of the sidewall, the portion of the inlet wall having the reduced thickness is positioned along a radius (R1) equal to the radius (R2) of the circular path along which the blades of the water injection device extend, the structure is selected from the group consisting of (i) a continuous recessed annular portion along the radius R1, (ii) a plurality of discontinuous arcuate recessed portions along a circular path on the radius R1, and (iii) an annular recessed portion positioned along the radius R1 and comprising a plurality of injection holes and a gastight membrane sealed onto the inner wall to sealingly cover the injection holes;

a lower delivery wall sealed to the rim of the body;

a predosed amount of comestible material in the capsule; and reinforcement members extending both on the inlet wall and sidewall of the body which are integral with the body to ensure improved rigidity of the inlet wall during perforation by the blades, wherein a predefined circular line of radius R1 corresponding to a circular line of radius R2 for extension of the blades of the water injection device is free of the reinforcement members.

11. The capsule according to claim 10, wherein the portion of the inlet wall having the reduced thickness extends from a central axis of the capsule to or towards a junction of the inlet wall with the sidewall.

12. The capsule according to claim 10, wherein the reinforcement members extend radially as a plurality of ridges.

13. The capsule according to claim 11, wherein the reinforcement members extend concentrically as a plurality of ridges around the central axis of the inlet wall.

14. The capsule according to claim 13, wherein the concentrically extending ridges extend outside of the circular line of radius R1.

15. The capsule according to claim 10, wherein the frusto-conical body is made of polymer material comprising polypropylene or polyethylene.

16. The capsule according to claim 10, wherein the frusto-conical body is made of a biodegradable material.

17. The capsule according to claim 10, wherein the rim comprises sealing means.

18. The capsule according to claim 10, in combination with a beverage production device comprising a water injection device that has a series of blades for injecting water into the capsule through the inlet wall; wherein the blades are placed along a circular path of radius R2 substantially equal to the radius R1.

19. The capsule according to claim 10, wherein the structure comprises a continuous recessed annular portion along the radius R1.

20. The capsule according to claim 1, wherein the structure comprises a continuous recessed annular portion along the radius R1.

* * * * *